United States Patent [19]
Mochizuki

[11] Patent Number: 5,930,020
[45] Date of Patent: Jul. 27, 1999

[54] BEAM SCAN DEVICE

[75] Inventor: Takeshi Mochizuki, Ibaraki, Japan

[73] Assignee: Hitachi Koki Co., Ltd., Tokyo, Japan

[21] Appl. No.: 09/072,690

[22] Filed: May 6, 1998

[30] Foreign Application Priority Data

May 9, 1997 [JP] Japan .................................. 9-119607

[51] Int. Cl.$^6$ .................................................. G02B 26/08
[52] U.S. Cl. ........................................ 359/204; 359/216
[58] Field of Search .................................. 359/204–207,
359/216–219; 347/232, 233, 243, 244

[56] References Cited

U.S. PATENT DOCUMENTS 5,251,055  10/1993  Koide ........................................ 359/216

FOREIGN PATENT DOCUMENTS 63-142316  6/1988  Japan .............................. G02B 26/10
64-10805   2/1989  Japan .............................. G02B 26/10

Primary Examiner—James Phan
Attorney, Agent, or Firm—Sughrue, Mion, Zinn, Macpeak & Seas, PLLC

[57] ABSTRACT

In a beam scan device, the distances between a plurality of beams in the scanning plane are decreased as the beams approach the reflecting surface of the rotary polygon mirror, and the distance between the intersection of the beams in the scanning plane and the reflecting surface of the rotary polygon mirror is optimized.

1 Claim, 7 Drawing Sheets

BEAM SCAN DEVICE

DETAILED DESCRIPTION OF THE INVENTION

1. Description of the Related Art

This invention relates a beam scan device which handles several beams.

2. Description of the Related Art

In a beam scan device employed in an image forming apparatus such as a laser printer, in order to increase the printing speed and the dot density thereof a scanning operation is carried out with a plurality of beams. For instance, in Japanese Patent Application (OPI) No. 142316/1988 (the term "OPI" as used herein means an "unexamined published application"), an array-shaped light source is employed as plural-beam generating means, and a scan operation is performed with a plurality of beams, and a plurality of light sources are arranged perpendicular to the direction of scan. In Japanese Patent Application Publication No. 10805/1989, a plurality of light sources are arranged substantially parallel in the direction of scan, so that the emergent pupil surface of the collimator lens and the reflecting surfaces of the rotary polygon mirror are conjugated with each other.

A beam scan device in which a plurality of light sources are arranged perpendicular to the direction of scan suffers from the following difficulties when it is required to increase the printing speed and the dot density:

(a) Because a plurality of beams are applied to a synchronizing photodetector substantially at the same time, it is impossible to individually control the beams. Hence, it is difficult to correct the shifts of the scan start positions of the plurality of beams which attribute to manufacture errors of the array-shaped light source, and change of the mounting position with the lapse of time.

(b) Because of a program in manufacture of the array-shaped light source, it is limited to decrease the distances between the light sources. Hence, an adjacent scan can not be performed on the surface which is scanned with the beams; that is, an interlaced scan is carried out. Accordingly, when the plurality of light sources are arranged, they must be greatly shifted in position from the optical axis of the scanning lens, which increases the aberration.

A beam scan device in which a plurality of light sources are arranged substantially parallel in the direction of scan, and the emergent pupil surface of the collimator lens and the reflecting surfaces of rotary polygon mirrors are conjugated with each other, suffers from the following difficulties when it is required to increase the printing speed and the dot density:

(c) Light quantity distributions on a scanned surface of a plurality of beams are different as shown in FIG. 13. Hence, in this case, the effective scan region is smaller than that in the case where only one beam is employed. In order to increase the effective scan region, the rotary polygon mirror must be increased in size, which adversely affects the high speed of rotation thereof.

SUMMARY OF THE INVENTION

The invention has been made to solve the above problems with the prior art, and therefore an object of the invention is to provide a beam scan device with which increases the printing speed and the dot density.

The foregoing object of the invention has been achieved by the provision of a beam scan device comprising: a rotary polygon mirror adapted to scan a surface with a plurality of beams; and a scanning lens for image-forming the plurality of beams on the surface to be scanned therewith, in which the plurality of beams are applied to a reflecting surface of the rotary polygon mirror while forming angles with one another in a scanning plane, the distances between the plurality of beams in the scanning plane decrease as the beams approach the reflecting surface of the rotary polygon mirror, and the distance L between the intersection of the plurality of beams in the scanning plane and the reflecting surface of the rotary polygon mirror is represented by the following Equation (1):

$$L = (r/2) \cos(\phi/2) \tag{1}$$

where r is the radius of the circumcircle of the rotary polygon mirror, and $\phi$ is the angle between the optical axis of the scanning lens and an incident beam to the rotary polygon mirror.

That is, in the invention, the position of the surface is optimized which is conjugated with the emergent pupil of the collimate lens in order that, even in the case where a plurality of light sources are arranged substantially in parallel with the direction of scan, it is unnecessary to increase the size of the rotary polygon mirror when compared with the case where a single beam is employed.

DETAILED DESCRIPTION OF THE PREFERRED EMBODIMENTS

Preferred embodiments of the invention will be described with reference to the accompanying drawings.

Figure 2:
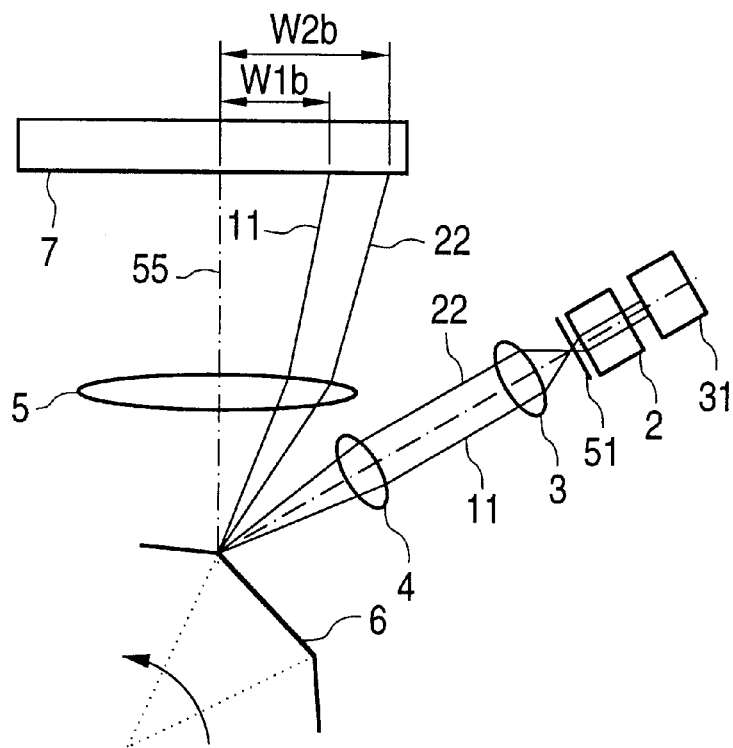
FIGS. 2 and 3 are explanatory diagram outlining the arrangement of comparison examples of the beam scan device.
Figure 3:
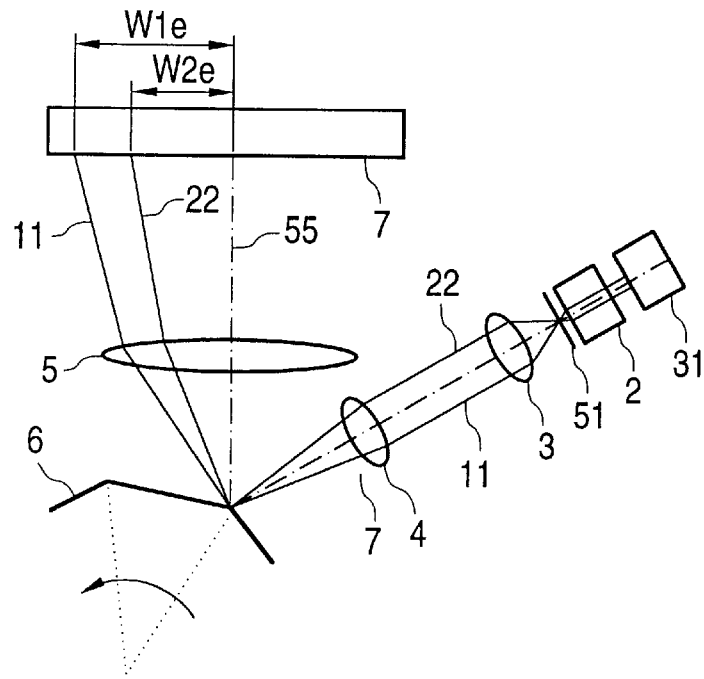

FIGS. 2 and 3 show an example of a beam scan device, one embodiment of the invention, in which the emergent pupil surface of a collimator lens and the reflecting surfaces of a rotary polygon mirror are conjugated with each other. In FIGS. 2 and 3, reference numeral 31 designates an array-shaped light source; 2, a collimator lens; 3, a first relay lens; 4, a second relay lens; 5, a scanning lens; 6, a rotary polygon mirror; 7, a photosensitive drum; 11, a first beam; 22, a second beam; 51, the emergent pupil surface of the collimator lens; and 55, the optical axis of the scanning lens 5.

The first beam 11 and the second beam 22 emitted from the array-shaped light source 1 meet each other on the emergent pupil surface 51 of the collimator lens. Thereafter, those beams pass through the first relay lens 3 and the second relay lens 4, and meet each other on the reflecting surface of the rotary polygon mirror 6 which is conjugated with the emergent pupil surface of the collimator lens. The first beam 11 and the second beam 22 are applied forming an angle in the scanning plane, and after being reflected by the rotary polygon mirror 6, applied to the scanning lens 5 forming an angle with each other, thus being image-formed at different positions on the photosensitive drum 7.

FIG. 2 shows the start end of the effective scan region, while FIG. 3 shows the finish end of the effective scan region. In FIG. 2, with respect to the optical axis 55, reference character W1$b$ denotes the effective region, on the scan start side, of the first beam 11; and W2$b$ designates the effective region, on the scan start side, of the second beam 22. In FIG. 3, with respect to the optical axis 55, reference character W1$e$, the effective region, on the scan finish side, of the first beam 11; and W2$e$, the effective region, on the scan finish side, of the second beam 22. Accordingly, the scan region W in which each of the first and second beams 11 and 22 is effective, is represented by the following Equation (2):

$$W = W1b + W2e \qquad (2)$$

FIGS. 4 through 8 shows the case where the surface is optimized which is conjugated with the emergent pupil surface of the collimator lens.

Figure 4:
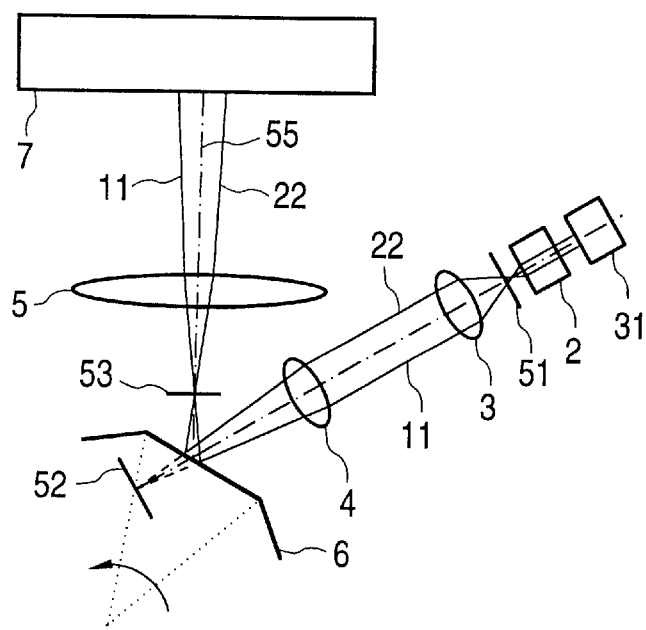
FIG. 4 is an explanatory diagram showing a state of the vicinity of the center of a scan in the beam scan device according to the invention.

In FIG. 4, reference numerals 52 and 53 are surfaces which are conjugated with the emergent pupil surface of the collimator lens, and are shifted from the reflecting surface of the rotary polygon mirror 6. The first beam 11 and the second beam 22 emitted from the array-shaped light source 1 meet each other on the emergent pupil surface 51 of the collimator lens, and thereafter are passed through the first relay lens 3 and the second relay lens 4, and advance so that they meet each other on the surface 52 which is conjugated with the emergent pupil surface 51 of the collimator lens. In practice, being reflected by the rotary polygon mirror 6, they meet each other on the surface 53 which is conjugated with the emergent pupil surface 51 of the collimator lens. In other words, the distance between the first beam 11 and the second beam 22 is decreased as they approach the reflecting surface of the rotary polygon mirror 6; however, they are not met with each other on the reflecting surface of the rotary polygon mirror 6.

Figure 5:
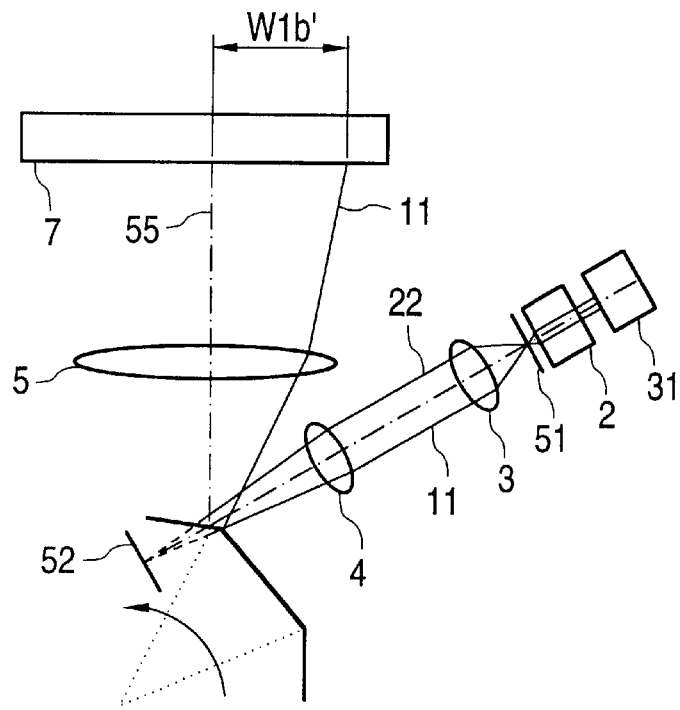
FIG. 5 is an explanatory diagram showing a state of the scan start side in the beam scan device according to the invention.
Figure 6:
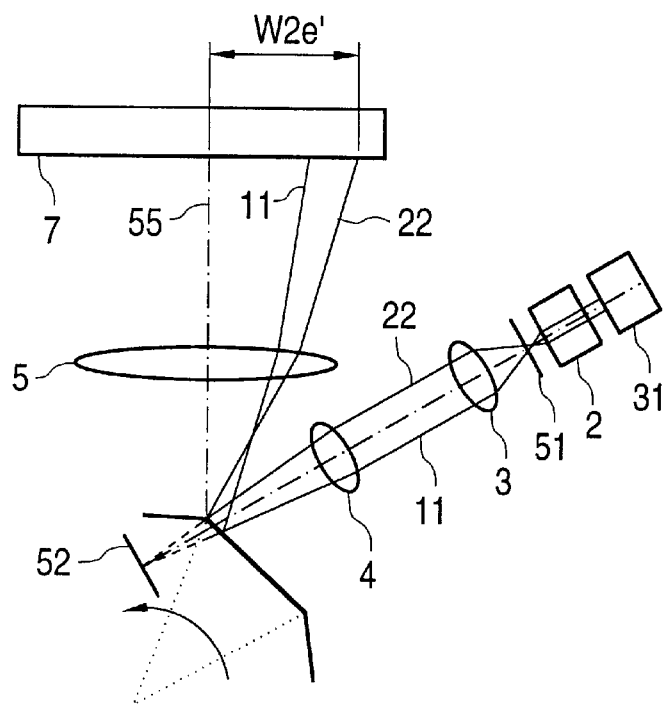
FIG. 6 is an explanatory diagram showing a state of the scan start side in the beam scan device according to the invention.
Figure 7:
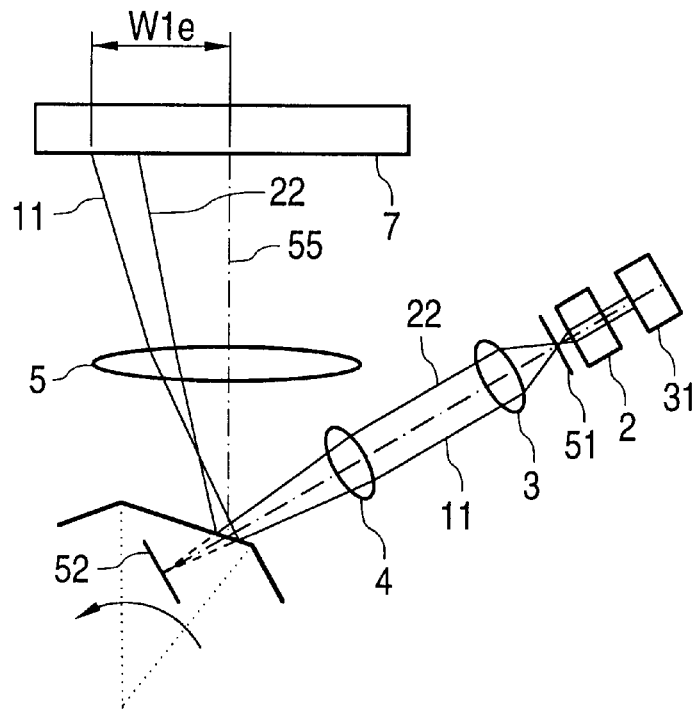
FIG. 7 is an explanatory diagram showing a state of the scan finish side in the beam scan device according to the invention.
Figure 8:
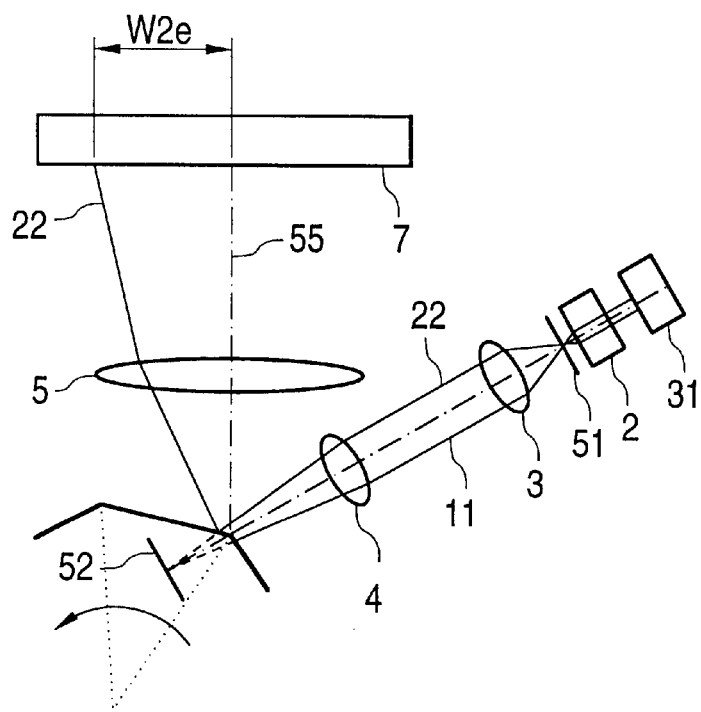
FIG. 8 is an explanatory diagram showing a state of the scan finish side in the beam scan device according to the invention.

FIG. 5 shows the start end of the effective scan region of the first beam 11; FIG. 6 shows the start end of the effective scan region of the second beam 22; FIG. 7 shows the finish end of the effective scan region of the first beam 11; and FIG. 8 shows the finish end of the effective scan region of the second beam 22. In those figures, with respect to the optical axis 55, reference character W1$b'$ denotes the effective region, on the scan start side, of the first beam 11; W2$b'$, the effective region, on the scan start side, of the second beam 22; W1$e'$, the effective region, on the scan finish side, of the first beam 11; and W2$e'$, the effective region, on the scan finish side, of the second beam 22. By optimizing the position of the surface which is conjugated with the emergent pupil surface of the collimator lens, the following Equations (3) and (4) are obtained:

$$W1b' = W2b' = Wb' \qquad (3)$$

$$W1e' = W2e' = We' \qquad (4)$$

Hence, the effective scanning region W' is represented by the following Equation (5):

$$W' = Wb' + We' \qquad (5)$$

And W is larger than W'.

$$W' > W \qquad (6)$$

Next, the most suitable position of the surface which is conjugated with the emergent pupil surface of the collimator lens.

Figure 9:
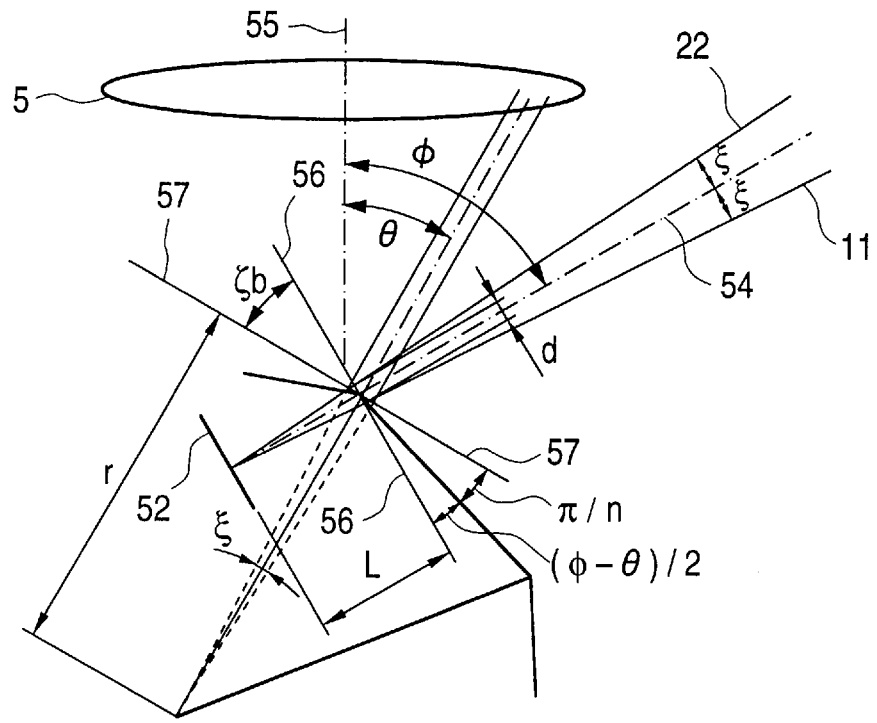
FIG. 9 is an explanatory diagram showing a state of the scan start side in the beam scan device according to the invention.
Figure 10:
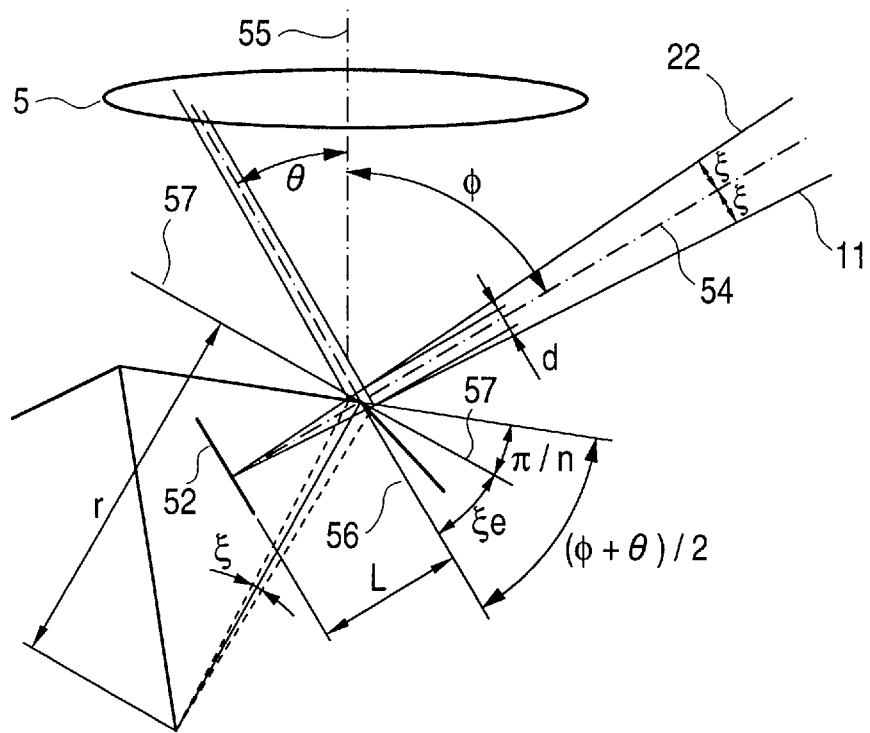
FIG. 10 is an explanatory diagram showing a state of the scan finish side in the beam scan device according to the invention.

FIG. 9 shows the scan start end; and FIG. 10 shows the scan finish end. In FIGS. 9 and 10, reference character 54 designates the central line of the first beam 11 and the second beam 22; 55, the optical axis of the scanning lens; 56, a surface which passes through the intersection of the reflecting surface of the rotary polygon mirror 6 and the central line 54, and is perpendicular to the latter 54; and 57, a plane which is in contact with the circumcircle of the rotary polygon mirror 6 on the central line 54. Further in those figures, reference character $\xi$ designates the angle which the first beam 11 and the second beam 22 form with respect to the central line 54; $\phi$, the angle formed by the optical axis 55 and the central line 54; $\theta$, the scanning angle, on one side, with respect to the optical axis 55; $\zeta$, an angle between a surface 56 and a surface 57; r, the radius of the circumcircle of the rotary polygon mirror 6; n, the number of surfaces of the rotary polygon mirror 6; d, the distance between the first beam 11 and the second beam 22 in the surface 56; and L, the distance between the surface 56 and the intersection of the prolongations of the first beam 11 and the second beam 22.

For simplification in description, the beam diameters of the first beam 11 and the second beam 22, and the movement of the reflecting surface which occurs as the rotary polygon mirror turns, will be disregarded. In practice, the first beam 11 and the second beam 22 are not on one and the same plane, and advance while somewhat shifting in a direction perpendicular to the scanning plane; however, it will be disregarded, and analysis will be made with the first and second beams projected onto a single scanning plane. Furthermore, it is assumed that $\xi$ is considerably small; that is, $\tan \xi = \xi$.

In view of the fact that the rotational angle of the rotary polygon mirror which makes the first beam 11 and the second beam 22 parallel after being reflected by the rotary polygon mirror 6 is $\xi$, the following Equations (7) and (8) are obtained from the figures:

$$d = L2\xi \qquad (7)$$

$$d = r\xi \cos \zeta \qquad (8)$$

On the other hand, $\zeta$ changes monotonously from the scan start end to the scan finish end. If it is assumed that it is $\zeta b$ at the scan start end, and $\zeta$ at the scan finish end, then the following Equations (9) and (10) are obtained from the figures:

$$\zeta b=(\phi-\theta)/2+(\pi/n) \quad (9)$$

$$\zeta e=(\phi+\theta)/2-(\pi/n) \quad (10)$$

The mean value $\zeta$ of those data is as follows:

$$\zeta=(\zeta b+\zeta e)/2=\phi/2 \quad (11)$$

When d and $\zeta$ are eliminated and rearranged, then Equation (1) is obtained:

$$L=(r/2)\cos(\phi/2) \quad (1)$$

Figure 1:
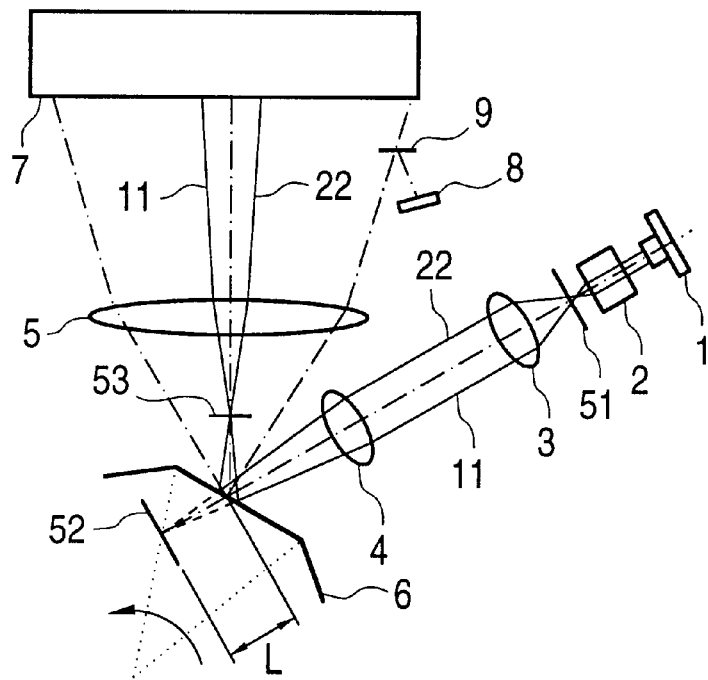
FIG. 1 is an explanatory diagram outlining the arrangement of an example of a beam scan device, which constitutes an embodiment of the invention.

FIG. 1 is a diagram showing the fundamental arrangement of the beam scan device according to the invention.

In FIG. 1, reference character 1 designates a two-element semiconductor laser array; 2, a collimator lens; 3, a first lens; 4, a second lens; 5, a scanning mirror; 6, a rotary polygon mirror; 7, a photosensitive drum; 8, a synchronizing photodetector; 9, a photo-detecting mirror; 11, a first beam; 22, a second beam; 51, the emergent pupil surface of the collimator lens; and 52 and 53, the surfaces which are conjugated with the emergent pupil of the collimator lens.

It is assumed that the photogenic point distance of the two-element semiconductor laser array is represented by $\delta_{LD}$, the focal lengths of the collimator lens, the first lens, and the second lens are represented by $f_{CL}$, $f_{RL1}$, and $f_{RL2}$, respectively. Furthermore, it is assumed that the distance between the two-element semiconductor laser array and the collimator lens is represented by d1, the distance between the collimator lens and the first relay lens by d2, the distance between the first relay lens and the second relay lens by d3, and the distance between the second relay lens and the reflecting surface of the rotary polygon mirror by d4. Moreover, $\phi$, $\theta$, $\zeta$, r, n and L are as was described above. Each lens is a thin lens, and the principal point distance is disregarded.

Figure 11:
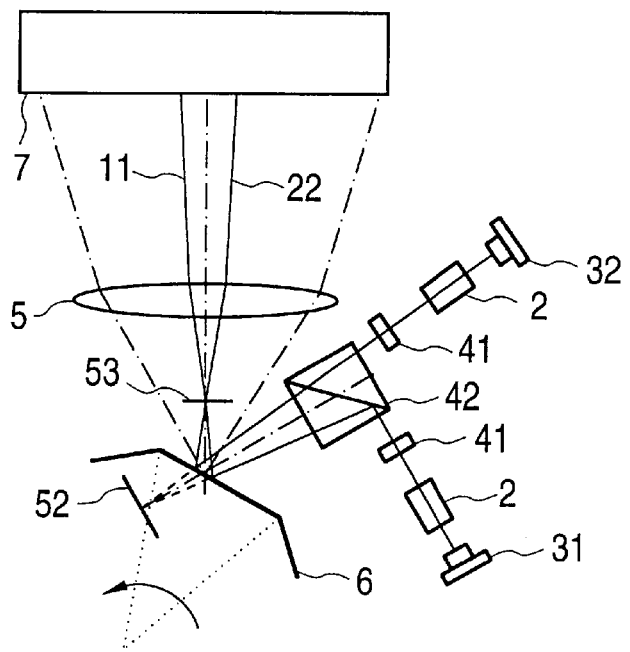
FIG. 11 is an explanatory diagram outlining the arrangement of another example of the beam scan device, which constitutes another embodiment of the invention.

$\delta_{LD}$=0.2 mm
$f_{CL}$=6 mm
$f_{RL1}$=30 mm
$f_{RL2}$=50 mm
d1=6 mm
d2=36 mm
d3=80 mm
d4=38.84 mm
$\phi=(\frac{1}{3})\pi$rad
$\theta=(\frac{1}{6})\pi$rad
r=35 mm
n=8
L=15.16 mm FIG. 11 is a diagram showing another example of the beam scan device, which constitutes another embodiment of the invention. In FIG. 11, reference numeral 31 and 32 denote a semiconductor laser; 41, a ½ wavelength retardation plate; 42, a polarization beam splitter.

Figure 12:
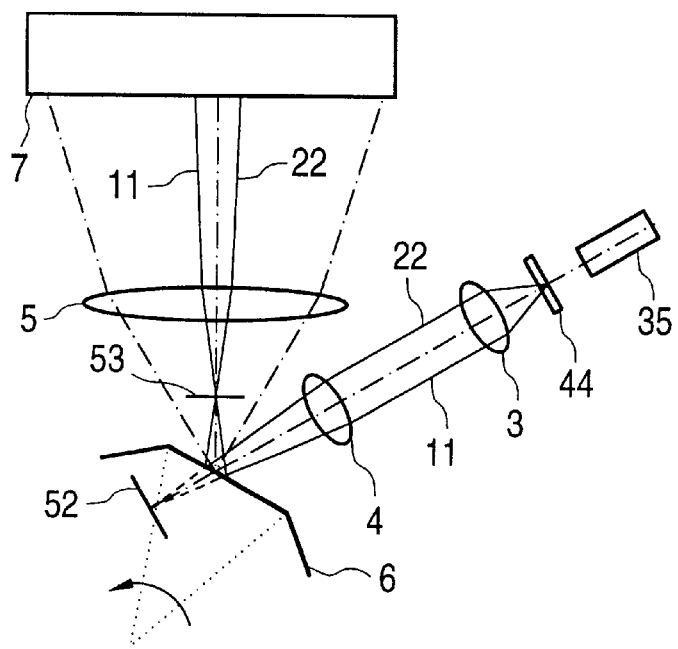
FIG. 12 is an explanatory diagram outlining the arrangement of another example of the beam scan device, which constitutes another embodiment of the invention.
Figure 13:
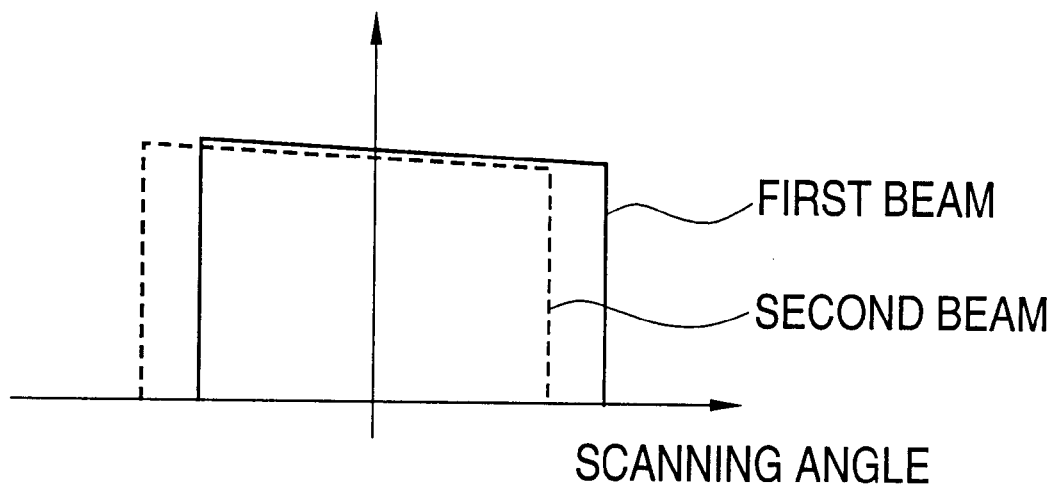
FIG. 13 is an explanatory diagram showing a light quantity distribution on a surface to be scanned in a conventional beam scan device.

FIG. 12 is a diagram showing another example of the beam scan device, which constitutes another embodiment of the invention. In FIG. 12, reference numeral 35 designates a gas laser; and 44, a diffraction grating.

As was described above, in the invention, the distances between a plurality of beams in the scanning plane are decreased as the beams approach the reflecting surface of the rotary polygon mirror, and the distance between the intersection of the beams in the scanning plane and the reflecting surface of the rotary polygon mirror is optimized. Hence, the beam scan device contributes to an increase both in printing speed and in dot density without increase of the size of the rotary polygon mirror.

What is claimed is:

1. A beam scan device comprising:

a rotary polygon mirror adapted to scan a surface with a plurality of beams; and a scanning lens for image-forming said plurality of beams on said surface to be scanned therewith;

wherein said plurality of beams are applied to a reflecting surface of said rotary polygon mirror while forming angles with one another in a scanning plane;

wherein distances between said plurality of beams in said scanning plane decrease as said beams approach said reflecting surface of said rotary polygon mirror; and wherein a distance L between the intersection of said plurality of beams in said scanning plane and said reflecting surface of said rotary polygon mirror is represented by the following Equation:

$$L=(r/2)\cos(\phi/2)$$

where r is the radius of the circumcircle of said rotary polygon mirror, and $\phi$ is the angle between the optical axis of said scanning lens and an incident beam to said rotary polygon mirror.

* * * * *